United States Patent
Kung et al.

(10) Patent No.: US 11,927,303 B2
(45) Date of Patent: Mar. 12, 2024

(54) WEARABLE DEVICE

(71) Applicant: HTC Corporation, Taoyuan (TW)

(72) Inventors: Tsen-Wei Kung, Taoyuan (TW); Chung-Ju Wu, Taoyuan (TW); Tsung Hua Yang, Taoyuan (TW); Chih-Yao Chang, Taoyuan (TW); Wei Te Tu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 107 days.

(21) Appl. No.: 17/872,012

(22) Filed: Jul. 25, 2022

(65) Prior Publication Data
US 2023/0279989 A1 Sep. 7, 2023

Related U.S. Application Data

(60) Provisional application No. 63/316,411, filed on Mar. 4, 2022.

(51) Int. Cl.
*G02B 27/01* (2006.01)
*F16M 13/04* (2006.01)
*A42B 1/242* (2021.01)

(52) U.S. Cl.
CPC ......... *F16M 13/04* (2013.01); *G02B 27/0176* (2013.01)

(58) Field of Classification Search
CPC .................. F16M 13/04; G02B 27/0176
See application file for complete search history.

(56) References Cited

U.S. PATENT DOCUMENTS

| 5,321,416 | A | * | 6/1994 | Bassett | A42B 3/145 |
| | | | | | 348/121 |
| 9,392,851 | B2 | * | 7/2016 | Lam | H04M 1/0254 |
| 9,442,522 | B2 | * | 9/2016 | Tussy | G06F 1/163 |
| 10,873,799 | B2 | * | 12/2020 | Wang | H04R 1/028 |
| 11,800,664 | B2 | * | 10/2023 | Lai | H05K 5/0217 |
| 2002/0019296 | A1 | * | 2/2002 | Freeman | G09F 21/02 |
| | | | | | 482/4 |
| 2009/0243965 | A1 | * | 10/2009 | Price | G02B 27/0176 |
| | | | | | 345/8 |

(Continued)

FOREIGN PATENT DOCUMENTS

| TW | M567902 | 10/2018 |
| TW | I674438 | 10/2019 |
| TW | I722935 | 3/2021 |

OTHER PUBLICATIONS

"Office Action of Taiwan Counterpart Application", dated Mar. 6, 2023, p. 1-p. 6.

*Primary Examiner* — Robert H Muromoto, Jr.
(74) *Attorney, Agent, or Firm* — JCIPRNET

(57) ABSTRACT

A wearable device includes a host, a first belt, a second belt, a circuit board, a cable, and an adjustment mechanism. The first belt, one end of which is connected to a first side of the host, has a cable holding part. One end of the second belt is connected to a second side of the host. The circuit board is disposed at an overlap of the first belt and the second belt. A first end and a second end opposite to each other of the cable are connected to the circuit board and the first side respectively, and a holding section of the cable is fixed to the cable holding part. The adjusting mechanism is disposed at an overlap of the first belt and the second belt to adjust an overlapping length of the first belt and the second belt.

7 Claims, 5 Drawing Sheets

(56) References Cited

U.S. PATENT DOCUMENTS

| | | | |
|---|---|---|---|
| 2014/0120839 A1* | 5/2014 | Lam | A41D 1/005 |
| | | | 455/41.2 |
| 2017/0131555 A1* | 5/2017 | Drinkwater | G02B 27/0176 |
| 2018/0255386 A1* | 9/2018 | Bristol | G02B 27/0176 |
| 2020/0213708 A1* | 7/2020 | Wang | H04R 1/1066 |
| 2021/0389590 A1 | 12/2021 | Freeman et al. | |

* cited by examiner

WEARABLE DEVICE

CROSS-REFERENCE TO RELATED APPLICATION

This application claims the priority benefit of U.S. provisional application Ser. No. 63/316,411, filed on Mar. 4, 2022. The entirety of the above-mentioned patent application is hereby incorporated by reference herein and made a part of this specification.

BACKGROUND

Technical Field

This application relates to a device, and in particular to a wearable device.

Description of Related Art

As the technology industry becomes more and more advanced, the types of display devices, their functions and usage methods become more and more diversified, and wearable display devices that can be worn directly on the user's body are also created in response. There are many types of head-mounted display devices. Take the eye-mask type of head-mounted display device as an example, after the user wears this type of display device, in addition to seeing a three-dimensional image, the image will change with the user's head rotation, which can provide the user with a more immersive experience.

To enable users to wear head-mounted display devices, there is usually a head belt on the head-mounted display device, which can be made of a soft material, such as plastic. When plastic is used as the material of the head belt, the back side of the head belt can be equipped with a gear, and the user can drive the gear through the knob of the roller to make the head belt longer or shorter accordingly, so that the user can wear the head belt with the appropriate degree of tension. However, when there is a circuit board on the side of the head-mounted display device that is far from the display, the cable connecting the display to the circuit board will shift with the adjustment of the head belt length, even causing unnecessary pulling and damage.

SUMMARY

This application provides a wearable device, which may improve the problem of easily damaged cables.

The wearable device of the application includes a host, a first belt, a second belt, a circuit board, a cable, and an adjustment mechanism. The first belt, one end of which is connected to a first side of the host, has a cable holding part. One end of the second belt is connected to a second side of the host. The circuit board is disposed at an overlap of the first belt and the second belt. A first end and a second end opposite to each other of the cable are connected to the circuit board and the first side respectively, and a holding section of the cable is fixed to the cable holding part. The adjustment mechanism is disposed at an overlap of the first belt and the second belt to adjust an overlapping length of the first belt and the second belt.

Based on the above, in the wearable device of the application, a holding section of the cable is fixed to the cable holding part, so that a part of the cable between the first end and the holding section does not move relative to the first belt, and the possibility of the cable being pulled and damaged is reduced.

DESCRIPTION OF THE EMBODIMENTS

Figure 1:
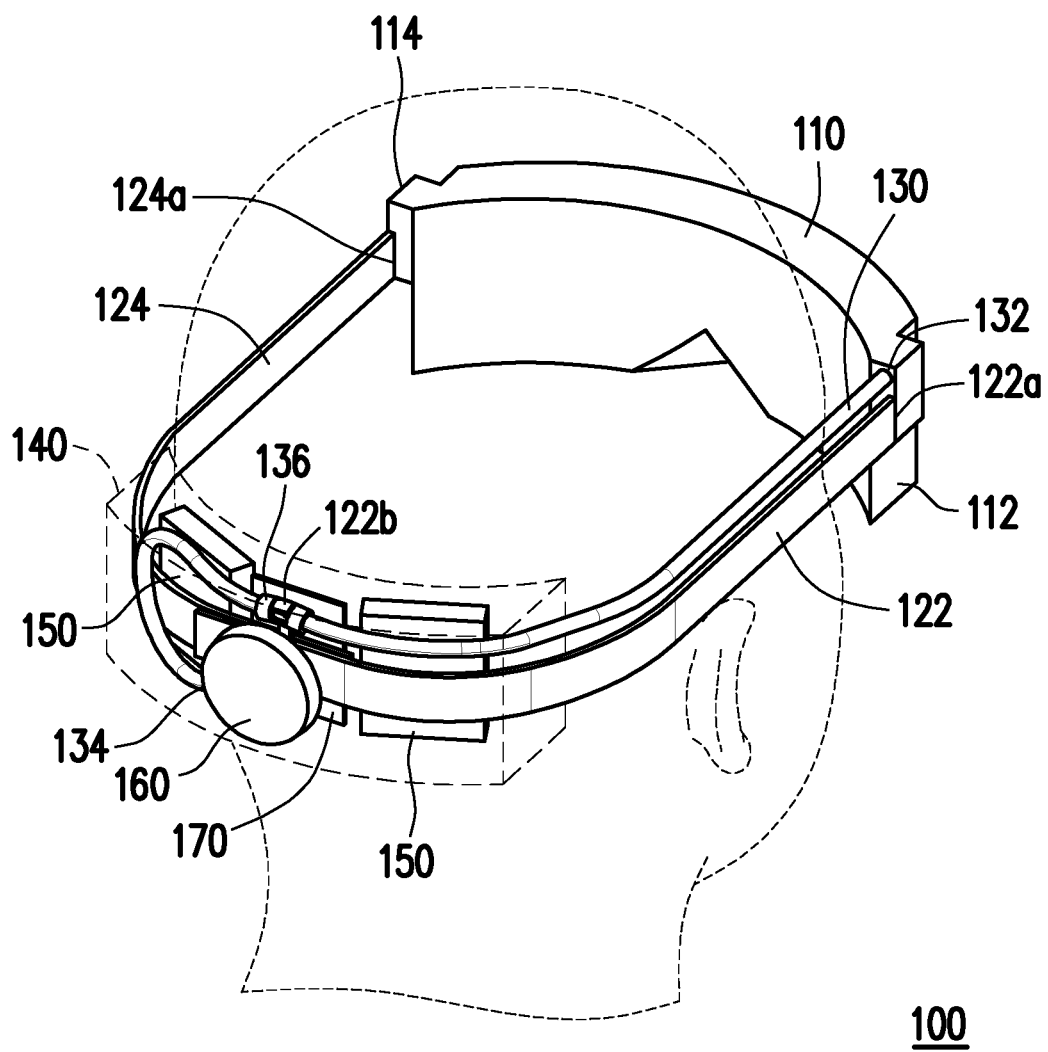
FIG. 1 is a schematic view of a wearable device according to an embodiment of the invention.

FIG. 1 is a schematic view of a wearable device according to an embodiment of the invention. Referring to FIG. 1, a wearable device 100 according to this embodiment includes a host 110, a first belt 122, a second belt 124, a circuit board 170, a cable 130, and an adjustment mechanism 160. The first belt 122, one end 122a of which is connected to a first side 112 of the host 110, has a cable holding part 122b. One end 124a of the second belt 124 is connected to a second side 114 of the host 110. The circuit board 170 is disposed at an overlap of the first belt 122 and the second belt 124. A first end 132 and a second end 134 opposite to each other of the cable 130 are connected to the circuit board 170 and the first side 112 respectively, and a holding section 136 of the cable 130 is fixed to the cable holding part 122b. The adjustment mechanism 160 is disposed at an overlap of the first belt 122 and the second belt 124 to adjust an overlapping length of the first belt 122 and the second belt 124.

In the wearable device 100 according to this embodiment, the first end 132 of the cable 130 is connected to the first side 112 of the host 110, and the holding section 136 of the cable 130 is fixed to the cable holding part 122b. One end 122a of the first belt 122 is also connected to the first side 112 of the host 110. That is, a section of the cable 130 from the first end 132 to the holding section 136 does not move relative to a section of the first belt 122 from one end 122a to the cable holding part 122b. Therefore, even when the overlapping length of the first belt 122 and the second belt 124 is adjusted using the adjustment mechanism 160, the section of the cable 130 is in a smooth and straight state and relatively free from bending. In other words, when the user adjusts the overlapping length of the first belt 122 and the second belt 124, the section of the cable 130 is less likely to be stretched or compressed significantly. In this way, the possibility of damage is reduced and the durability is improved, and the overall appearance is more compact.

Figure 2:
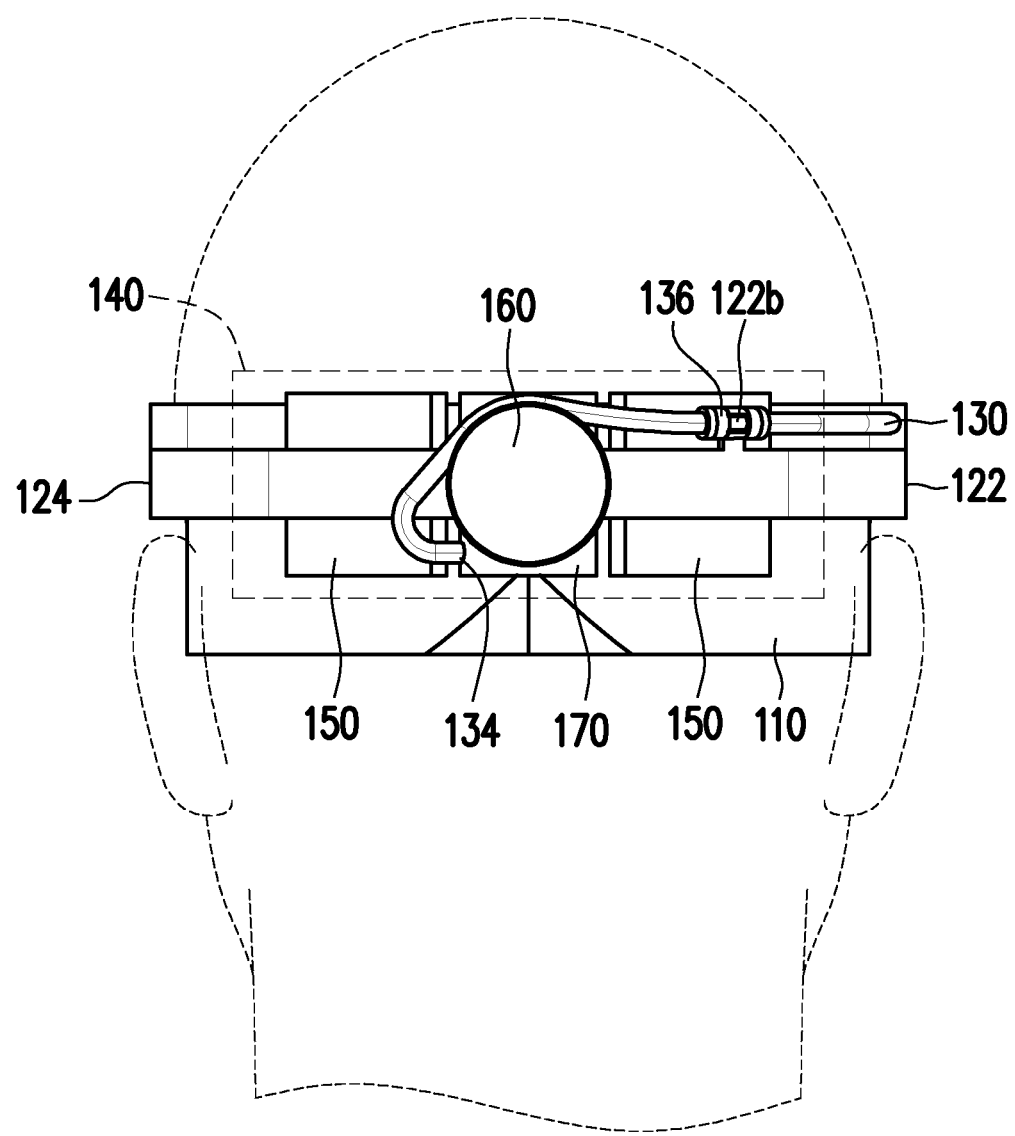
FIG. 2 is a schematic rear view of the wearable device of FIG. 1 before a length of a belt is adjusted.
Figure 3:
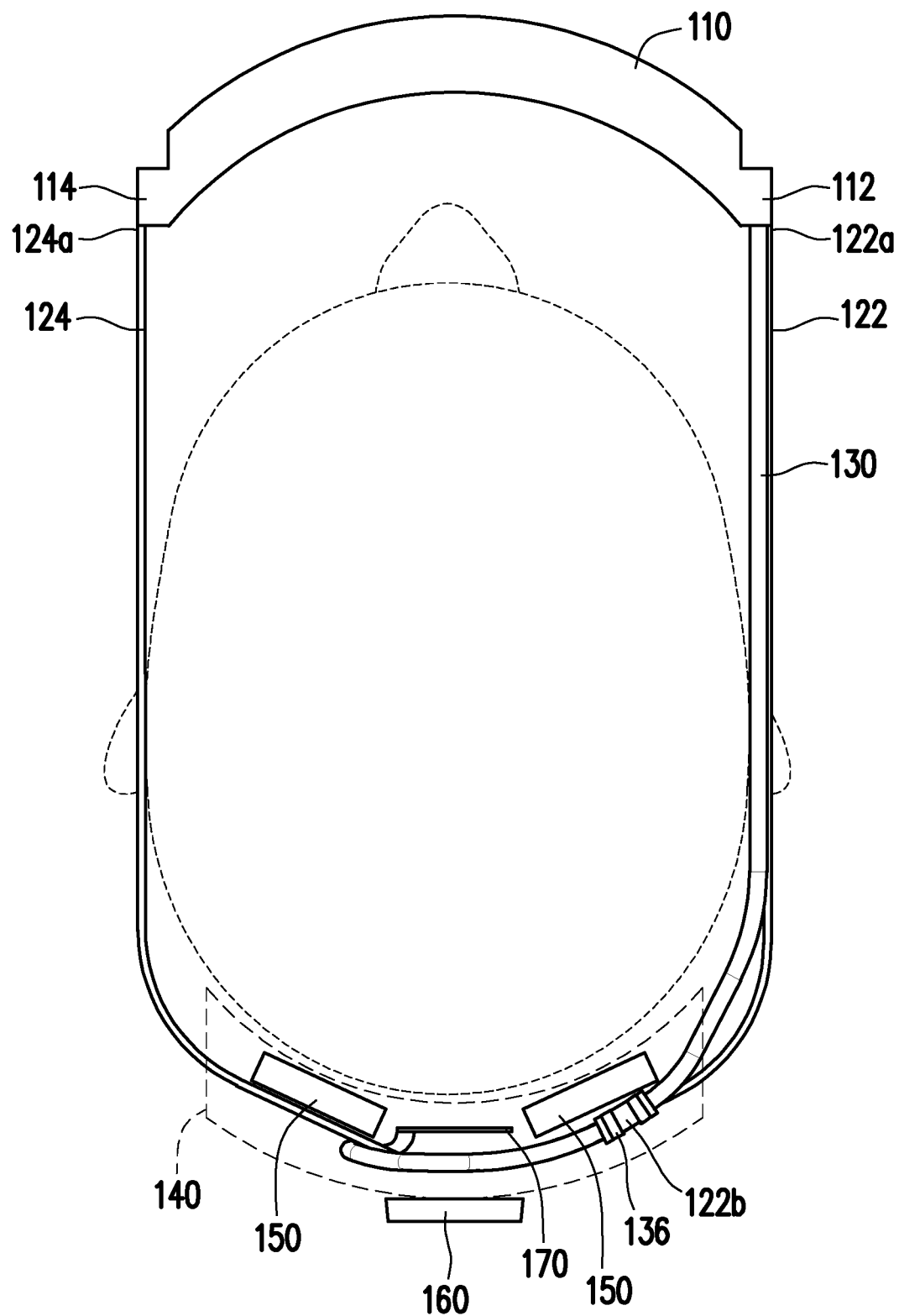
FIG. 3 is a schematic top view of the wearable device of FIG. 2.

FIG. 2 is a schematic rear view of the wearable device of FIG. 1 before a length of a belt is adjusted. FIG. 3 is a schematic top view of the wearable device of FIG. 2. Referring to FIG. 2 and FIG. 3, before the length of the belt is adjusted, the overlapping length of the first belt 122 and the second belt 124 may be adjusted to be a shortest possible length to allow for smooth placement of the wearable device 100 on the heads of different users. At this time, a section of the cable 130 from the second end 134 to the holding section 136 is also bent to a greater extent.

Figure 4:
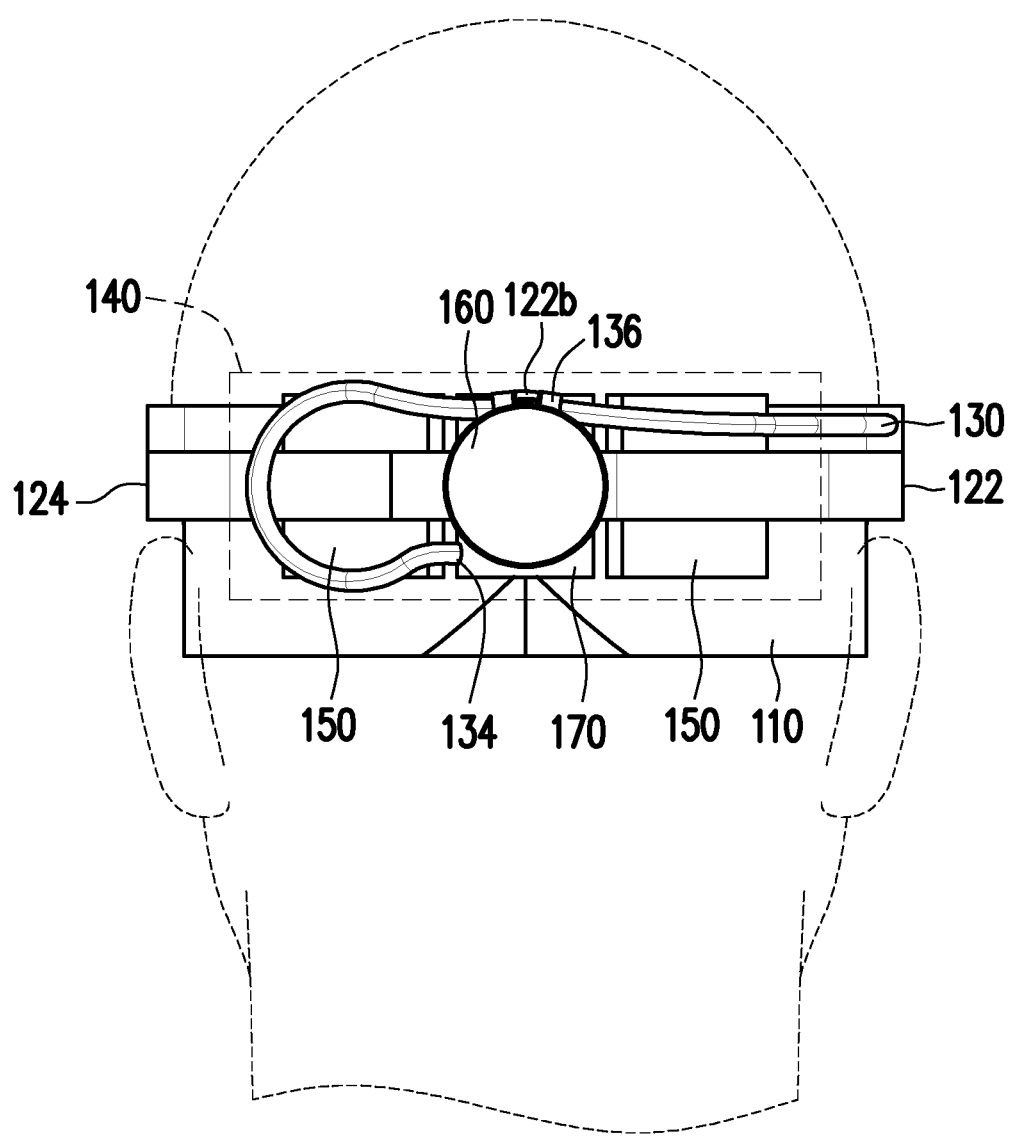
FIG. 4 is a schematic rear view of the wearable device of FIG. 1 after the length of the belt is adjusted.
Figure 5:
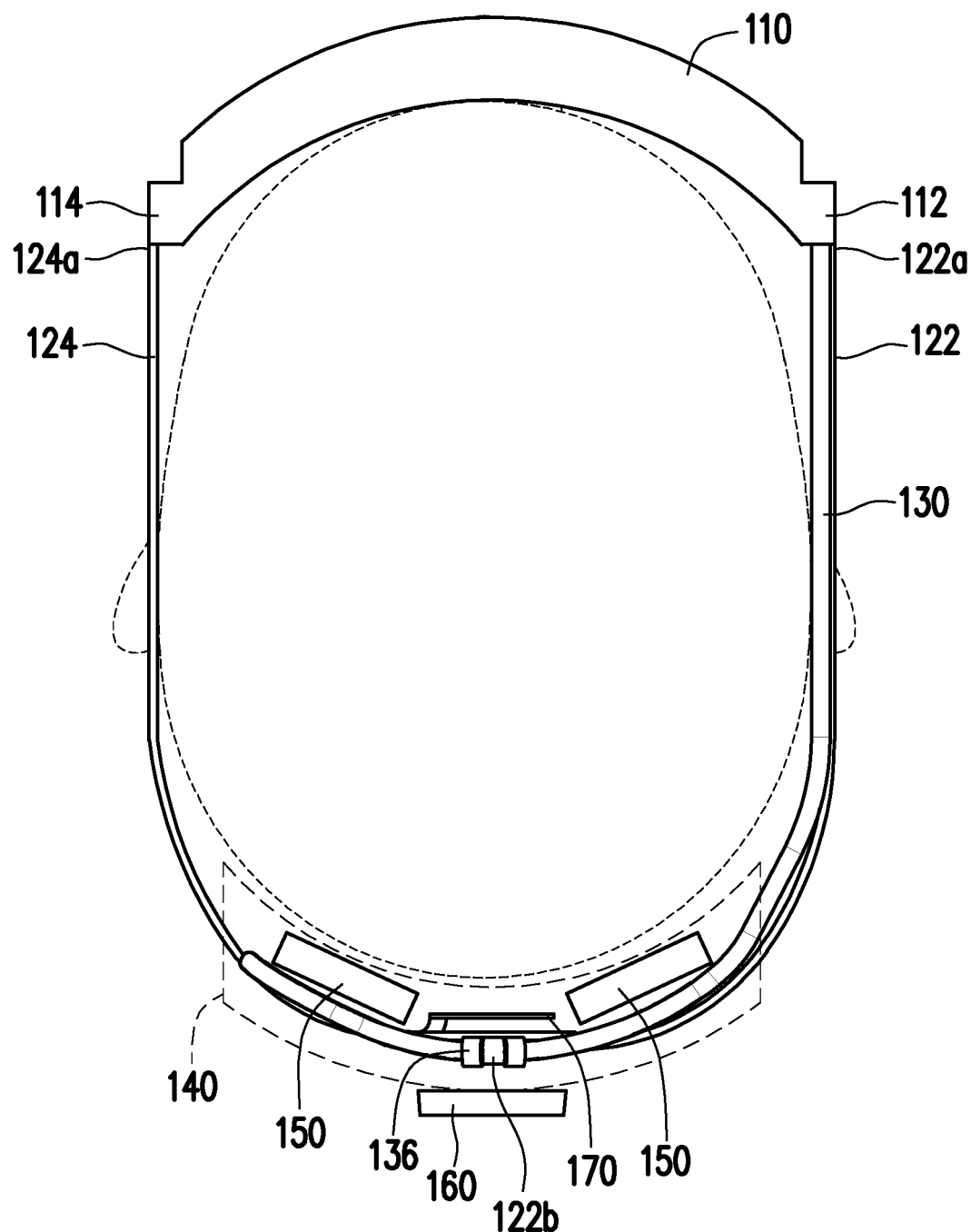
FIG. 5 is a schematic top view of the wearable device of FIG. 4.

FIG. 4 is a schematic rear view of the wearable device of FIG. 1 after the length of the belt is adjusted. FIG. 5 is a schematic top view of the wearable device of FIG. 4.

Referring to FIG. 4 and FIG. 5, after the wearable device 100 is put on the user's head, the overlapping length of the first belt 122 and the second belt 124 may be adjusted so that the wearable device 100 is fixed on the user's head with an appropriate degree of tightness. At this time, only the section of the cable 130 from the second end 134 to the holding section 136 is bent, but because this section is shorter, it is easy to straighten the cable and less likely to be damaged by unintended bending or pulling.

Referring to FIG. 2 and FIG. 4, on the other hand, a part of the cable 130 located between the circuit board 170 and the cable holding part 122b is not fixed. Therefore, when the overlapping length of the first belt 122 and the second belt 124 is adjusted, an appearance of the part of the cable 130 located between the circuit board 170 and the cable holding part 122b is also changed. For example, the part of the cable 130 located between the circuit board 170 and the cable holding part 122b in FIG. 2 has an appearance similar to a J shape, and the part of the cable 130 located between the circuit board 170 and the cable holding part 122b in FIG. 4 has an appearance similar to a U shape. In addition, when the overlapping length of the first belt 122 and the second belt 124 is adjusted, a length of a part of the cable 130 between the cable holding part 122b and the host 110 is unchanged, and a length of a part of the first belt 122 located between the cable holding part 122b and the host 110 is unchanged. Thus, the part of the cable 130 between the cable holding part 122b and the host 110 is less displaced relative to the first belt 122 and is less likely to be stretched or compressed significantly.

According to this embodiment, the cable holding part 122b is a C-type buckle, but the application is not limited thereto. In addition, widths of both sides of the holding section 136 of the cable 130 may be larger to confine the position of the cable holding part 122b between the both sides of the holding section 136 to avoid relative displacement between the holding section 136 and the cable holding part 122b.

According to this embodiment, the host 110 is a head-mounted display, which may be applied, for example, in the field of virtual reality system, augmented reality system, or mixed reality system, etc. However, the host may also be other electronic devices, as long as there is an adjustment of the length of the belt and the need to use a cable to connect the host to the circuit board, the technology of this application may be applied.

According to one embodiment, the wearable device 100 further includes a casing 140. The overlap of the first belt 122 and the second belt 124 is located within the casing 140. The circuit board 170 is disposed in the casing 140, and the adjustment mechanism 160 is disposed in the casing 140. The casing 140 may protect the overlap of the first belt 122 and the second belt 124 and is used to accommodate the circuit board 170. The adjustment mechanism 160 is, for example, to adjust the degree of the overlap of the first belt 122 and the second belt 124 by using the cooperation of the gear and the rack or other techniques, but the application is not limited thereto. The user may rotate the knob 160 to drive the first belt 122 and the second belt 124 until sufficient clamping force is generated and the wearable device 100 can be worn stably on the user's head. The cable holding part 122b according to this embodiment is confined within the casing 140 and thus provides proper protection of the cable holding part 122b and the holding section 136.

According to one embodiment, the wearable device 100 further includes one or more batteries 150 disposed in the casing 140 and electrically connected to the circuit board 170. The battery 150 is electrically connected to the host 110 through the circuit board 170 and the cable 130 to supply power to the circuit board 170 and the host 110. In this architecture, the wearable device 100 does not need to be connected to an external power source, which may avoid limiting the user's movement while the user is using the wearable device 100. Moreover, such a structure also allows the wearable device 100 to be more balanced in terms of weight on the user's head and has better operational stability. According to other embodiments, the wearable device 100 may also not have the battery 150 and the circuit board 170, and the cable 130 further extends to a power bank, an external computer, or a handheld electronic device. Similarly, when the user adjusts the overlapping length of the first belt 122 and the second belt 124, the part of the cable 130 from the first end 132 to the holding section 136 is less likely to be bent, reducing the possibility of damage to the cable due to significant pulling.

To sum up, in the wearable device of the application, the holding section of the cable is fixed to the cable holding part of the first belt, so that when the overlapping length of the first belt and the second belt is adjusted, the part of the cable from the first end to the holding section is less likely to be bent, reducing the possibility of damage to the cable due to significant pulling. At the same time, the appearance is more compact, which may also reduce the length of the exposed cable and reduce unnecessary bending, thus achieving the goal of protecting the cable and increasing its durability. In addition, when the wearable device has a battery located on the other side of the host, it can provide users with convenience in operation, and the balanced counterweight also provides better operational stability.

What is claimed is:

1. A wearable device, comprising:
   a host;
   a first belt, wherein one end of the first belt is connected to a first side of the host, having a cable holding part;
   a second belt, wherein one end of the second belt is connected to a second side of the host;
   a circuit board disposed at an overlap of the first belt and the second belt;
   a cable, wherein a first end and a second end opposite to each other of the cable are connected to the circuit board and the first side respectively, and a holding section of the cable is fixed to the cable holding part; and
   an adjustment mechanism disposed at an overlap of the first belt and the second belt to adjust an overlapping length of the first belt and the second belt.

2. The wearable device according to claim 1, wherein the cable holding part is a C-type buckle.

3. The wearable device according to claim 1 further comprising a casing, wherein the overlap of the first belt and the second belt is located in the casing, the circuit board is disposed in the casing, and the adjustment mechanism is disposed in the casing.

4. The wearable device according to claim 3 further comprising a battery disposed in the casing and electrically connected to the circuit board, wherein the battery is electrically connected to the host through the circuit board and the cable.

5. The wearable device according to claim 3, wherein the cable holding part is confined within the casing.

6. The wearable device according to claim 1, wherein a part of the cable located between the circuit board and the cable holding part is not fixed, when the overlapping length of the first belt and the second belt is adjusted, an appearance of the part of the cable located between the circuit board and the cable holding part is also changed.

7. The wearable device according to claim 1, wherein when the overlapping length of the first belt and the second belt is adjusted, a length of a part of the cable located between the cable holding part and the host is unchanged, and a length of a part of the first belt located between the cable holding part and the host is unchanged.

\* \* \* \* \*